Figures 1, 2:
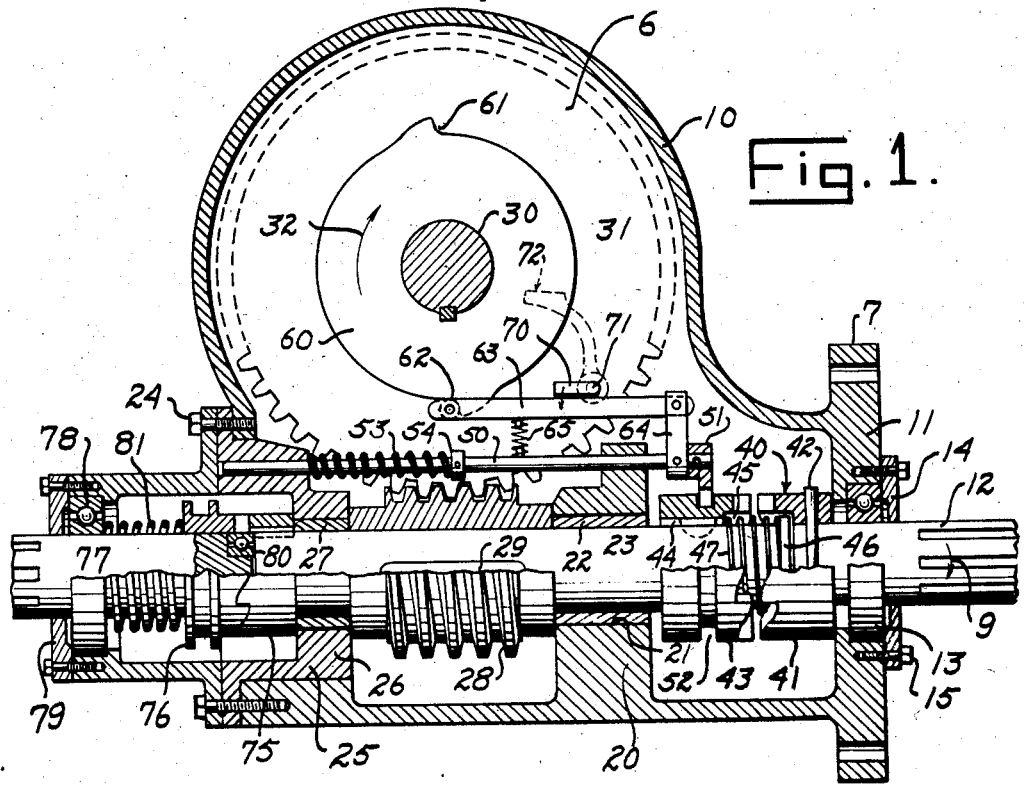

Jan. 26, 1943.     M. H. WOODRUFF ET AL     2,309,152
POWER LIFT
Filed April 15, 1939

INVENTORS
MOFFITT H. WOODRUFF
EVERETT W. TODD
Jesse R. Stone
Lester B. Clark
ATTORNEYS Patented Jan. 26, 1943

2,309,152

UNITED STATES PATENT OFFICE 2,309,152

POWER LIFT

Moffitt H. Woodruff, Lubbock, and
Everett W. Todd, Houston, Tex.

Application April 15, 1939, Serial No. 268,028

2 Claims. (Cl. 192—139)

This invention relates to a power lift and power take-off for tractors and comprises a continuation in part of our co-pending application filed September 18, 1935, and maturing in a Patent No. 2,155,177, issued April 18, 1939.

It is a primary object of the invention to provide a device of the class described comprising a simple, efficient and economical construction which may be readily actuated by the power from the prime mover of a tractor for raising and lowering implements connected thereto and also for imparting rotative power to other devices or implements.

Another object is to provide a tractor power lift construction which may be set in operation manually and which will be automatically stopped when the raising or lowering operation has been completed.

Still another object is to provide a power lift device for raising or lowering a tractor implement and including power take-off means for imparting rotative power to a tractor drawn or other device.

Another object is to provide a power lift and power take-off device for tractors, such device including an over-running clutch between the declutching mechanism and the driven device.

These and other objects will be apparent from the following description taken in connection with the drawing in which Fig. 1 is a vertical section thru a unit embodying the invention.

Fig. 2 is an elevational view showing the relation of the unit of Fig. 1 with the elements of a tractor with which the device is used.

The invention is generally illustrated in Fig. 2 of the drawing in combination with the tractor 1 having a drive housing 2 thru which the drive axle 3 passes and is driven by the tractor motor thru suitable gearing (not shown) to impart tractive effort to the wheels 4. The drive housing 2 is enlarged at 5 and encases suitable driving instrumentalities whereby power is imparted to the power lift mechanism 6, shown in detail in Fig. 1.

It is to be noted that the lift mechanism 6 is secured to the drive housing 5 thru the flange 7. The unit 6 may therefore be attached to or detached from the tractor 1 as desired.

The lift mechanism 6 comprises a housing 10 which bears the flange 7 at its forward end and includes an end wall 11 in which a drive shaft 12 is journaled by means of anti-friction bearing 13 secured in place by means of retaining ring 14 and cap screws 15. While such construction is preferred it to be understood that the shaft 12 may be integral with the tractor 1 and protrude therefrom into the housing 10.

Intermediate the ends of the housing 10 is a vertical wall 20 having an aperture 21 in alignment with the drive shaft 12. A bearing 22 fitting within the aperture 21 rotatably supports the forward end of a driven shaft 23 in coaxial alignment with the drive shaft 12.

A collar construction 25 is detachably connected to the rear end of the housing 10 and includes a vertical portion 26 and a bearing 27 which serves as a rear support for the driven shaft 23. A worm 28 is fixed to the driven shaft 3 between the walls 20 and 26 by means of a key 29.

A transverse shaft 30 is mounted in the housing 10 in spaced relation with the driven shaft 23 and has a worm gear 31 fixed thereto. The worm gear 31 meshes with the worm 28 and is therefore driven in the direction indicated by the arrow 32 when the driven shaft 23 is rotated in the direction indicated by the arrow 9.

The transverse shaft 30 extends outwardly thru the side wall of the housing 10 and is provided at one end with a crank to which may be suitably connected any device such as a tractor implement which is to be raised or lowered.

A clutch mechanism generally indicated as 40 is provided to connect and disconnect the drive shaft 12 with the driven shaft 23. This clutch mechanism comprises a clutch member 41 fixed to the drive shaft 12 by means of pin 42. A complementary clutch member 43 is mounted upon the forward end of the driven shaft 23 and is provided with the groove 44 whereby the member is slidably but non-rotatably fixed to the driven shaft 23.

The clutch members 41 and 43 are counterbored at their adjacent ends to provide an annular space 45 to receive the shoulder 46 on the forward end of the shaft 23, a compression spring 47 surrounding the shaft 23 and engage the shoulder 46 and the clutch member 43 so that the clutch member will be restrained from movement under any tendency to vibrate when the clutch is released, and also to facilitate the movement of the clutch member 43 to released position by snap action as the jaws of the clutch members move from engaging position.

The clutch control mechanism comprises a throw-out rod 50 which slidably fits within openings in the upper portion of the member 25 and the wall 20. This rod bears a yoke 51 at its forward end which constantly engages within the groove 52 in the clutch member 43. A spring 53 surrounds the rod 50 and engages a collar 54 thereon. It is to be understood that this spring is considerably stronger than is the spring 47 and hence the clutch will be engaged whenever the spring 53 is permitted to move the throw-out rod 50 forwardly. A cam member 60 is also fixed upon the transverse shaft 30 and is provided with spaced seats 61 upon the camming surface. A follower 62 is mounted between yoke members 63 which are attached to the throw-out rod 50 thru a vertical extension 64. The yoke members 63 are constantly urged upwardly by means of spring 65 whereby the follower 62 is maintained in engagement with the cam 60. Unless the yoke 63 is held downwardly by means of the arm 70 connected to shaft 71 and foot pedal 72 exteriorly of the housing 10, the follower 62 will be engaged by one of the seats 61 and the clutch mechanism 40 will be disengaged whereupon the transmission of power between the drive shaft 12 and the driven shaft 23 will terminate. It is understood that the cam seats 61 are so oriented upon the cam 60 that the declutching operation will take place only when the tractor implement has been moved to its elevated or lowered position. Thus operation takes place automatically and it is only necessary when it is desired for the tractor implement to be moved to a different position, for the operator to apply a sufficient pressure to the foot pedal 72 to overcome the force exerted by the spring 65 and disengage the follower 62 from the seat 61.

The rearward end of the driven shaft 23 is provided with a jaw clutch collar 75 which engages a complementary collar 76 fixed to the forward end of a power take-off shaft 77. The rear end of the shaft 77 is mounted in an antifriction bearing 78 secured in place by means of retaining collar 79. The forward end of this shaft is rotatably mounted within the clutch collar 75 by means of bearing 80. Spring 81 surrounds the power take-off shaft 77 and maintains the clutch members 75 and 76 in engagement.

The power take-off mechanism just described may be removed from the remainder of the unit 6, the rearward end of the housing 19 then being enclosed by means of a suitable cap held in place by the cap screws 24. If, however, this mechanism is used it serves the purpose of providing a power take-off for the transmission of power of rotation to an implement or other device to be driven by the tractor 1.

When the power take-off mechanism is used, it is to be understood that means (not shown) is provided for holding the yoke 63 depressed so that the clutch 40 remains engaged and power is uniformly supplied to the mechanism driven thru the unit 6. It is also to be understood that the lifting arm on the transverse shaft 30 is disconnected from the shaft or from the movement which would otherwise be lifted thereby.

Whenever it is desired to terminate the transmission of power thru the unit 6 the yoke 63 is released and the follower 62 is permitted to engage one of the seats 61 whereupon the clutch 40 will be disengaged.

It is apparent that the rotation of the shaft 23 must terminate as soon as the clutch 40 is disengaged. There is a tendency for the rotating mechanism to continue until the rotational energy thereof has been dissipated. The clutch elements 75 and 76 constitute an over-running clutch whereby the shaft 23 may stop rotating as soon as the clutch 40 is disengaged and the driven mechanism will stop as soon as its energy of rotation is dissipated.

The operation of the disclosed construction is believed apparent from the foregoing description. By way of summary it may be stated that when it is desired that an implement be moved from an elevated to lowered position or vice-versa, it is only necessary in accordance with the invention to apply sufficient pressure to the foot-pedal 72 to release the follower 62 from seat 61. There-upon the clutch mechanism 40 will become engaged by virtue of the pressure exerted by the spring 53. The mechanism will then be driven thru the drive shaft 12 until the follower 62 engages the succeeding seat 61 so that the clutch 40 will be disengaged and the operation discontinued.

If, on the other hand, it is desired to drive rotative mechanism through the unit 6, connection is made thereto through the power take-off shaft 77 and the clutch 40 is constantly engaged by suitably holding the yoke 63 depressed so that declutching will not occur. When declutching is desired it is necessary only to permit the yoke 63 to move upwardly for engagement with one of the seats or camming surfaces 61 as already described.

What is claimed is:

1. A power lift for tractors comprising drive and driven shafts, clutch members on said shafts, one of said clutch members being axially shiftable to connect and disconnect the driven shaft to and from the drive shaft, a worm on the driven shaft, a transverse shaft, a worm gear on the transverse shaft engaging said worm, camming means fixed to said transverse shaft and having spaced camming surfaces thereon, clutch releasing means attached to the shiftable clutch member and engageable and movable by one of the camming surfaces to move the clutch member and thereby to disconnect the connection between the drive and driven shafts, said clutch releasing means comprising a yoke engageable with the movable clutch member, a spring operably connected to urge the movable clutch member into engagement with the fixed clutch member, a shift member connected to said yoke and including a follower normally engaged by one of said camming surfaces whereby the shiftable clutch member is held in spaced relation with the other of said members, and manually operable means for releasing the follower from engagement with said camming surface.

2. A power lift for tractors comprising drive and driven shafts, clutch members on said shafts, one of said clutch members being axially shiftable to connect and disconnect the driven shaft to and from the drive shaft, a worm on the driven shaft, means normally resiliently urging the clutch members apart, a worm gear on the transverse shaft engaging said worm, camming means fixed to said transverse shaft and having spaced camming surfaces thereon, clutch releasing means attached to the shiftable clutch member and engageable and movable by one of the camming surfaces to move the clutch member and thereby to disconnect the connection between the drive and driven shafts, said clutch releasing means comprising a yoke engageable with the movable clutch member, a spring operably connected to urge the movable clutch member into engagement with the fixed clutch member, said spring being capable of overcoming the force exerted by said first mentioned means, a shift member connected to said yoke and including a follower normally engaged by one of said camming surfaces whereby the shiftable clutch member is held in spaced relation with the other of said clutch members, and manually operable means for releasing the follower from engagement with said camming surface.

MOFFITT H. WOODRUFF.
EVERETT W. TODD.